(12) United States Patent
Kobylanski

(10) Patent No.: US 10,277,156 B2
(45) Date of Patent: Apr. 30, 2019

(54) ARCHITECTURE STRUCTURE OF INTERCONNECTED ELECTRONIC POWER MODULES FOR HEXAPHASE ROTARY ELECTRICAL MACHINE, AND HEXAPHASE ROTARY ELECTRICAL MACHINE COMPRISING ARCHITECTURE STRUCTURE OF THIS TYPE

(71) Applicant: VALEO EQUIPEMENTS ELECTRIQUES MOTEUR, Creteil (FR)

(72) Inventor: Luc Kobylanski, Paris (FR)

(73) Assignee: Valeo Equipements Electriques Moteur, Creteil (FR)

( * ) Notice: Subject to any disclaimer, the term of this patent is extended or adjusted under 35 U.S.C. 154(b) by 0 days.

(21) Appl. No.: 15/325,762

(22) PCT Filed: Jul. 17, 2015

(86) PCT No.: PCT/FR2015/051970
§ 371 (c)(1),
(2) Date: Jan. 12, 2017

(87) PCT Pub. No.: WO2016/012703
PCT Pub. Date: Jan. 28, 2016

(65) Prior Publication Data
US 2017/0163198 A1    Jun. 8, 2017

(30) Foreign Application Priority Data
Jul. 21, 2014 (FR) ..................................... 14 56994

(51) Int. Cl.
*H02P 25/22* (2006.01)
*H02K 11/33* (2016.01)

(52) U.S. Cl.
CPC .............. *H02P 25/22* (2013.01); *H02K 11/33* (2016.01)

(58) Field of Classification Search
CPC ................................. H02K 11/33; H02P 25/22
USPC .............................................. 318/496, 568.22
See application file for complete search history.

(56) References Cited

U.S. PATENT DOCUMENTS

| 2010/0072928 A1* | 3/2010 | Welchko | ............. B60L 11/1803 318/400.13 |
| 2014/0009016 A1 | 1/2014 | Seidenbinder et al. | |
| 2016/0141997 A1* | 5/2016 | Duguey | .................. H02P 25/22 318/400.02 |

FOREIGN PATENT DOCUMENTS

| CN | 101986515 A | * | 3/2011 | |
| CN | 101986515 A | * | 3/2011 | |
| DE | 102009044240 A1 | * | 7/2010 | ........... H02K 11/046 |

(Continued)

*Primary Examiner* — Jorge L Carrasquillo
(74) *Attorney, Agent, or Firm* — Berenato & White, LLC

(57) ABSTRACT

The invention relates to an architecture which is applied to a six-phase rotary electric machine of the type comprising first and second three-phase systems offset angularly at a predetermined offset angle. First and second phase windings of the three-phase systems respectively carry first (U1, V1, W1) and second (U2, V2, W2) phase currents controlled by electronic power modules (15, 16, 17). The electronic modules comprise first and second power terminals (12, 13) each capable of being electrically connected to first and second instances of the first and second phase windings. According to the invention, the electronic power modules are interconnected such as to balance the losses.

6 Claims, 3 Drawing Sheets

(56) References Cited

FOREIGN PATENT DOCUMENTS

DE 102009044240 A1 * 7/2010 ........... H02K 11/046
FR 2967845 A1 5/2012

* cited by examiner

ARCHITECTURE STRUCTURE OF INTERCONNECTED ELECTRONIC POWER MODULES FOR HEXAPHASE ROTARY ELECTRICAL MACHINE, AND HEXAPHASE ROTARY ELECTRICAL MACHINE COMPRISING ARCHITECTURE STRUCTURE OF THIS TYPE

CROSS-REFERENCE TO RELATED APPLICATIONS AND CLAIM TO PRIORITY

This application is a national stage application of International Application No. PCT/FR2015/051970 filed Jul. 17, 2015, which claims priority to French Patent Application No. 1456994 filed Jul. 21, 2014, the disclosures of which are incorporated herein by reference and to which priority is claimed.

FIELD OF THE INVENTION

The present invention relates to an architecture of interconnected electronic power modules for a hexaphase rotary electrical machine of the double-three-phase type, i.e. comprising a stator with two three-phase windings which are offset angularly relative to one another.

The invention also relates to a hexaphase rotary electrical machine of the double-three-phase type comprising this architecture, in particular for applications in motor vehicles.

BACKGROUND OF THE INVENTION

It is known that polyphase rotary electrical machines have advantages over three-phase machines in terms of reduction of the oscillations of the torque in motor mode, or ease of elimination of the harmonics in generator mode.

The performance of the polyphase machines is also increased. For example, the stator losses of a hexaphase machine can be close to 7% less than those of an equivalent three-phase machine.

However, the increase in the number of phases gives rise to an increase in the number of current sensors which are necessary in order to control the machine, since a sensor is a priori necessary in order to measure each independent current variable. Since the sum of all the intensities is zero, the number of sensors necessary is equal to the number of phases less one, i.e. five sensors in the case of a hexaphase machine.

A double-three-phase structure makes it possible to reduce the number of sensors, and makes possible various optimisations of a mechatronic type relating to the architecture of the electronic power modules which are connected to the stator of the machine.

In particular, in the architecture disclosed in patent application FR2967845 by the company VALEO EQUIPEMENTS ELECTRIQUES MOTEUR, each electronic power module comprises power semiconductors corresponding to two branches of a hexaphase bridge, i.e. with two phases, which makes possible a reduction of the size, and facilitates the integration of the modules on a rear bearing of the machine.

For the purpose of applications in the highly competitive motor vehicle industry, the objective of the present invention is to obtain a rotary electrical machine with the best possible performance, with electronic components with a fixed cost, and therefore with predetermined characteristics for this cost.

When the machine is stopped or is rotating at a very low speed, the inventive body has found points of heating of the electronic power modules which are liable to give rise to an avalanche phenomenon, and to destroy the semiconductors.

SUMMARY OF THE INVENTION

The objective of the present invention is thus to eliminate this disadvantage, without reducing the performance by limiting the phase currents, or without selecting components with improved characteristics which would have an effect on the costs.

Specifically, its subject is an architecture of interconnected electronic power modules for a hexaphase rotary electrical machine, of the type comprising three first and three second phase windings forming a first and a second three-phase system offset angularly by a predetermined offsetting angle.

In this type of machine, the first and second phase windings have respectively first and second phase currents passing through them which the electronic power modules can control.

These electronic power modules are of the type which each comprise electronic components arranged in a casing, and external connection elements comprising first and second power terminals which can each be connected electrically to first and second examples of the first and second phase windings.

According to the invention, in order to eliminate the aforementioned disadvantage, these electronic power modules are interconnected such as to balance losses of the electronic power modules.

More particularly, the electronic power modules are interconnected such that an assembly of each phase offsetting between the first and second examples of the first and second phase windings minimises variation of total instantaneous electric power according to an electrical angle in each of the electronic power modules.

This minimisation leads to total instantaneous electric power in each of the electronic power modules which is substantially constant according to this electrical angle.

According to a particular embodiment of the architecture of interconnected electronic power modules for a hexaphase rotary electrical machine according to the invention, the offsetting angle is 30°, and the phase offsetting is 90°.

The invention also relates to a hexaphase rotary electrical machine of the double-three-phase type which comprises an architecture of interconnected electronic power modules as described above.

These few essential specifications will have made apparent to persons skilled in the art the advantages provided by the architecture of interconnected electronic power modules for a hexaphase rotary electrical machine of the double-three-phase type according to the invention, as well as by the corresponding rotary electrical machine of the double-three-phase type, in comparison with the prior art.

The detailed specifications of the invention are given in the description which follows in association with the appended drawings. It should be noted that these drawings serve the purpose simply of illustrating the text of the description, and do not constitute in any way a limitation of the scope of the invention.

DETAILED DESCRIPTION OF THE PREFERRED EMBODIMENT(S)

Figure 1:
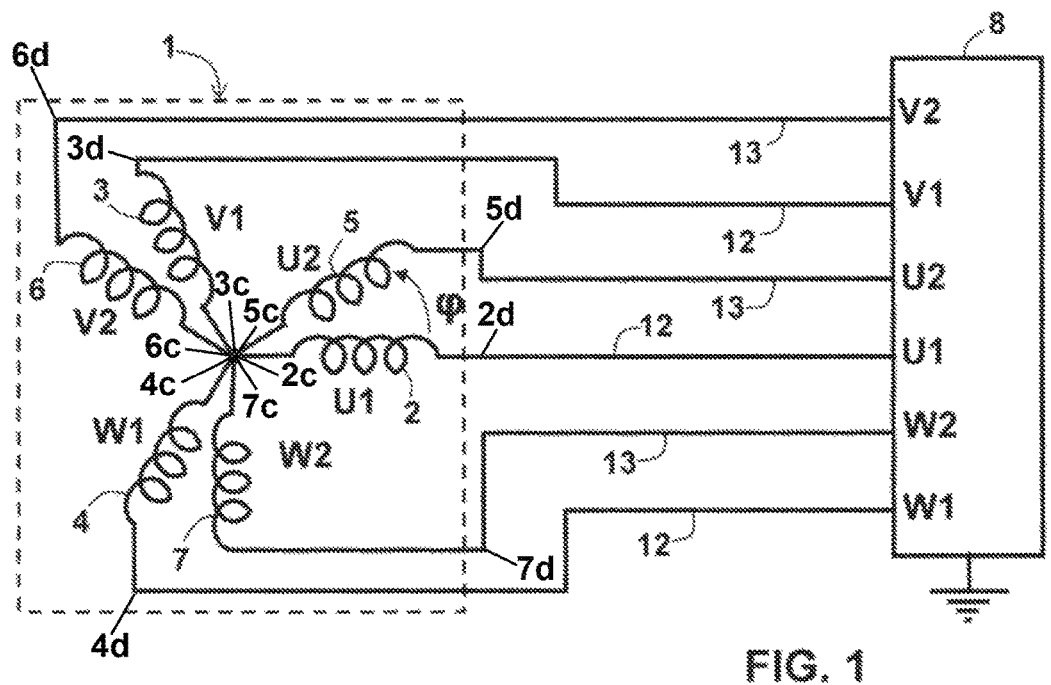
FIG. 1 represents schematically a double-three-phase rotary electrical machine and a hexaphase bridge for control of the phase currents.

As shown clearly by the schematic representation in FIG. 1, in the preferred embodiment of the invention the stator 1 of the double-three-phase rotary electrical machine comprises a first three-phase system in star form constituted by three first phase windings 2, 3, 4, and a second three-phase system in star form constituted by three second phase windings 5, 6, 7, which are offset relative to one another by an offsetting angle φ of 30°.

Each of the first 2, 3, 4 and second 5, 6, 7 phase windings has a distal end (2d, 3d, 4d, 5d, 6d, 7d, respectively) which is connected to a hexaphase bridge 8 and a proximal, common end (2c, 3c, 4c, 5c, 6c, 7c, respectively) thereof. As best shown in Figure, all of the first 2, 3, 4 and second 5, 6, 7 phase windings are electrically connected to each other at the proximal, common ends (2c, 3c, 4c, 5c, 6c, 7c) thereof.

First phase currents U1, V1, W1 circulating in the first phase windings 2, 3, 4, and second phase currents U2, V2, W2 circulating in the second phase windings 5, 6, 7 are controlled by the hexaphase bridge 8 in a manner which in itself is known (the first and second phase currents are indicated respectively as U1, V1, W1 and U2, V2, W2 successively in the anticlockwise direction; by convention, U1 and U2 have phase shifting which is equal to the offsetting angle φ).

In practice, the hexaphase bridge 8 is produced in the form of three electronic power modules 15, 16, 17 which each incorporate two branches of the bridge 8 corresponding to two different phases U1, U2; V1, V2; W1, W2, and which are arranged on a rear bearing of the rotary electrical machine.

A module 15, 16, 17 can control two currents of the same three-phase system (phase shifted by 120°), or two currents of two different systems (phase shifted by 30, 90 or 150°).

In fact, the first and second power terminals 12, 13 of each module 15, 16, 17 can be connected to the first and second phase windings according to a plurality of different configurations.

Figure 3A:
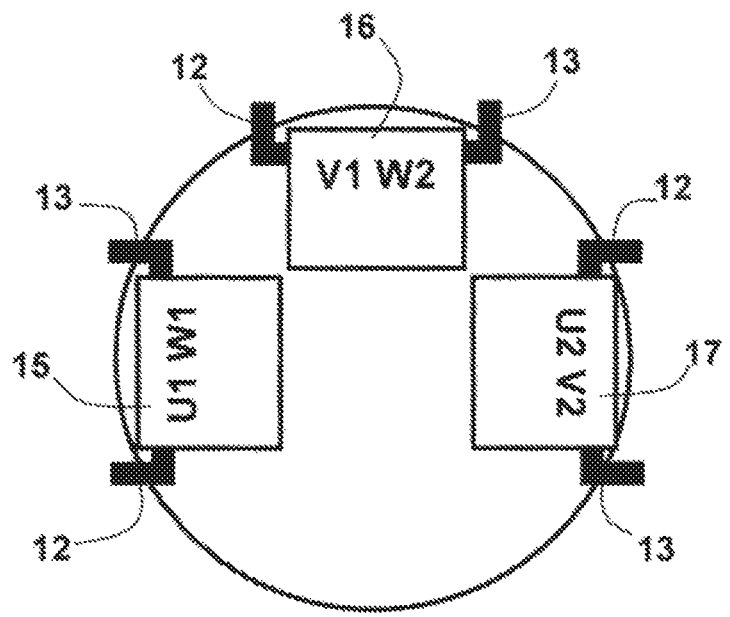
FIGS. 3a and 3b show schematically respectively a non-optimised architecture of interconnected electronic power modules, and an optimised architecture according to the invention.

FIG. 3a shows schematically a first configuration in which:
the first and second power terminals 12, 13 of a first electronic power module 15 are connected respectively to a first example U1 of the first phase windings 2, 3, 4, and to a second example W1 of these first phase windings 2, 3, 4;
the first and second power terminals 12, 13 of a second electronic power module 16 are connected respectively to another first example V1 of the first phase windings 2, 3, 4, and to another second example W2 of the second phase windings 5, 6, 7;
the first and second power terminals 12, 13 of a third electronic power module 17 are connected respectively to yet another first example U2 of the second phase windings 5, 6, 7, and to yet another second example V2 of these second phase windings 5, 6, 7.

In this first configuration, the assembly of each phase offsetting α between the first and second examples of the first and second phase windings 2, 3, 4, 5, 6, 7 is as follows:
α1=120° for the first electronic power module 15 incorporating the components which control the first phase currents U1 and W1;
α2=150° for the second electronic power module 16 incorporating the components which control the first and second phase currents V1 and W2;
α3=120° for the third electronic power module 17 incorporating the components which control the second phase currents U2 and V2.

In each electronic power module 15, 16, 17, a total instantaneous electric power is proportional to the expression:

$$P(\theta)=\sin^2\theta+\sin^2(\theta-\alpha) \text{ where } \theta=\omega t,$$

ω being the pulsation of the phase currents, and t the time variable.

Figure 2:
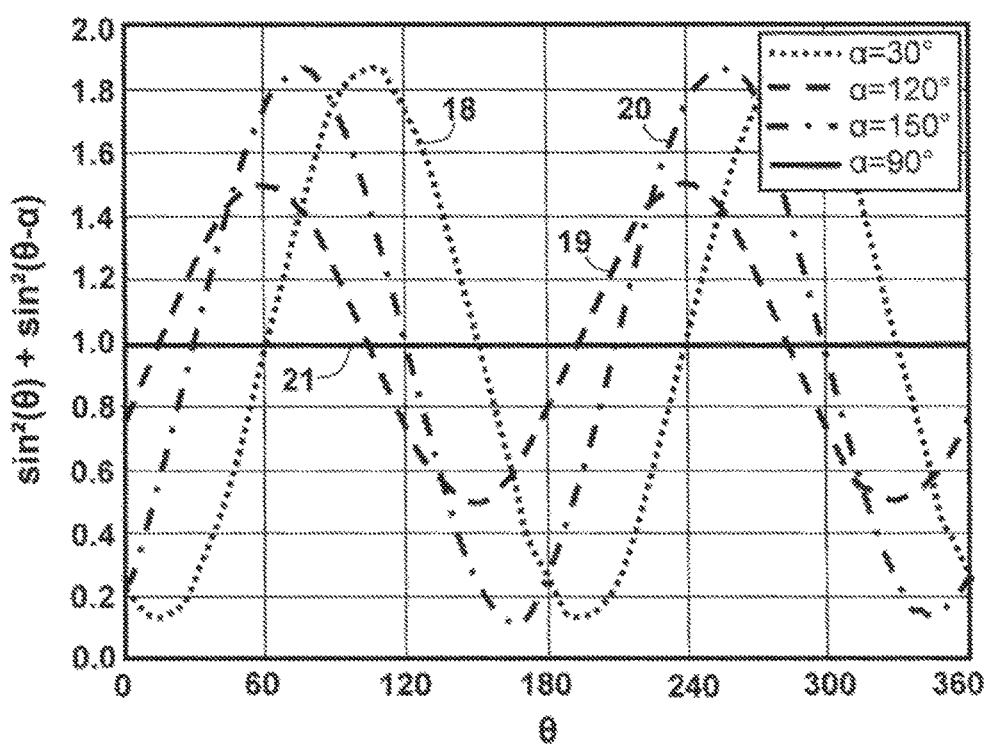
FIG. 2 represents a total instantaneous electric power in two phase windings for a plurality of phase offsetting between these windings.

FIG. 2 represents this expression for different values of the phase offsetting α:
α=30° (dotted line) 18;
α=120° (broken line) 19;
α=150° (dot and dash line) 20.

For the first phase currents U1 and W1 which are offset by 120°, the total instantaneous electric power varies by +/−50% around its mean value.

For the first and second phase currents V1 and W2 which are offset by 150°, the total instantaneous electric power varies by +/−86% around its mean value.

When the machine is rotating at high speed, these phase currents very rapidly, and thermal inertia of the electronic power modules 15, 16, 17 filters points of dissipated power: a temperature then corresponds to a mean dissipated power.

On the other hand, when the machine is stopped or is rotating at very low speed, the thermal inertia of the electronic power modules 15, 16, 17 is insufficient to prevent their heating at the power points.

FIG. 2 shows that, for a phase offsetting α equal to 90° (solid line 21), the total instantaneous electric power is constant.

Figure 3B:
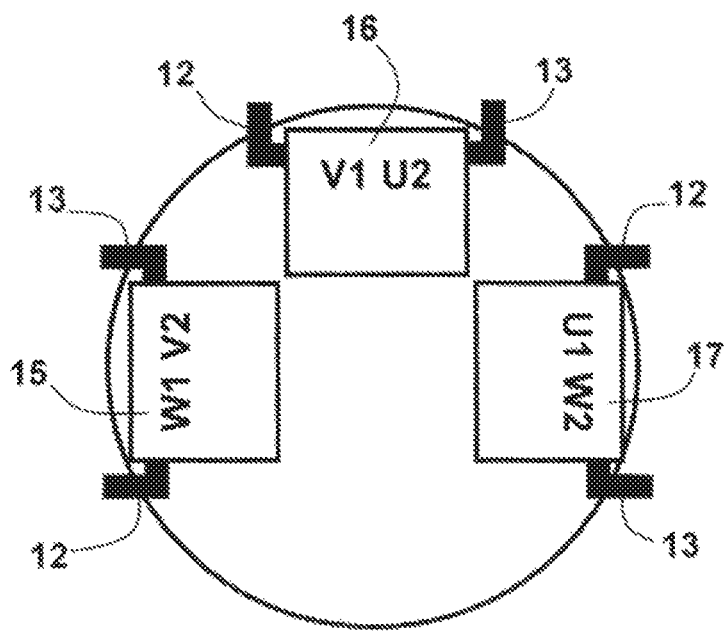

In the preferred embodiment of the invention in which the angular offsetting φ between the first and second three-phase systems is 30°, the first and second power terminals 12, 13 of each module 15, 16, 17 can be connected to the first and second examples of the first and second phase windings, such as to provide this phase offsetting α equal to 90°, as shown clearly in FIG. 3b.

In order to provide this second optimal configuration:
the first and second power terminals 12, 13 of a first electronic power module 15 are connected respectively to a first example W1 of the first phase windings 2, 3, 4, and to a second example V2 of these second phase windings 5, 6, 7;
the first and second power terminals 12, 13 of a second electronic power module 16 are connected respectively to another first example V1 of the first phase windings 2, 3, 4, and to another second example U2 of the second phase windings 5, 6, 7;
the first and second power terminals 12, 13 of a third electronic power module 17 are connected respectively to yet another first example U1 of the first phase windings 2, 3, 4, and to yet another second example W2 of these second phase windings 5, 6, 7.

In this second configuration, the losses, in particular the thermal losses, in each electronic power module 15, 16, 17, are independent from the electrical angle.

Other associations in pairs of the phases U1, U2; V1, V2; W1, W2 in the electric power modules 15, 16, 17 would lead to the existence of worse more severe cases.

Consequently, this second configuration shown in FIG. 3*b* makes it possible to maximise an available engine torque in prolonged running with the rotor blocked (in particular: function of pre-positioning of the crankshaft, function of maintenance of a position, etc.).

Figure 4:
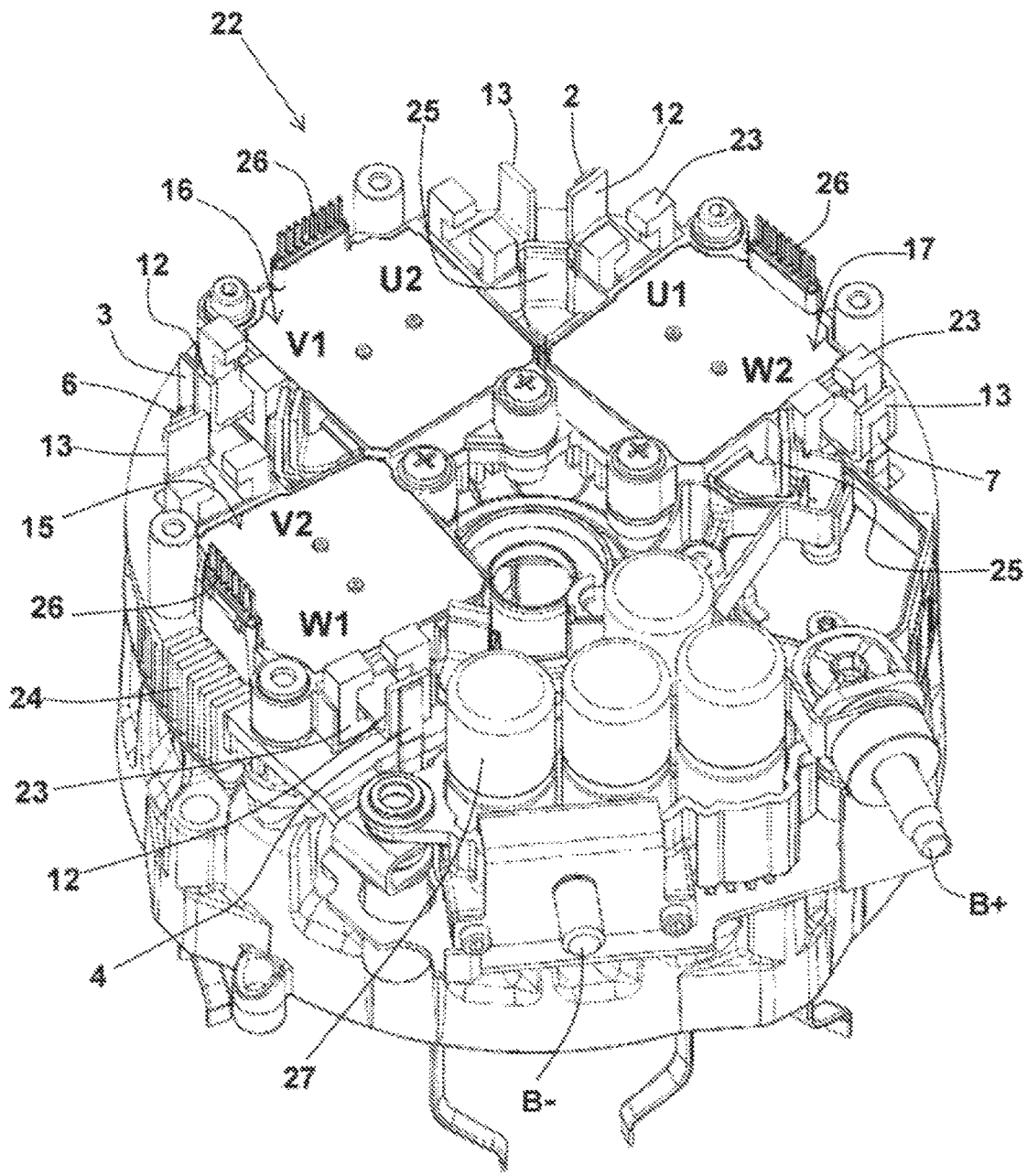
FIG. 4 is a view of a rear bearing of a hexaphase rotary electrical machine of the double-three-phase type comprising the architecture of interconnected electronic power modules shown in FIG. 3b.

A specific example of a hexaphase rotary electrical machine 22 of the double-three-phase type comprising an architecture of electronic power modules 15, 16, 17 according to the invention is shown in FIG. 4.

Persons skilled in the art will easily recognise the three electronic power modules 15, 16, 17 on the rear bearing presented.

These electronic power modules 15, 16, 17 are in the form of casings with a generally rectangular parallelepiped form.

Each casing 15, 16, 17 comprises external connection elements comprising first and second power terminals 12, 13 which extend perpendicularly to two opposite faces.

At the output from the electronic power modules 15, 16, 17, these first and second power terminals 12, 13 each comprise a magnetic circuit 23 and a Hall-effect sensor for measurement of the phase current U1, U2; V1, V2; W1, W2.

The rear bearing presented in FIG. 4 is that of a double-three-phase rotary electrical machine according to the preferred embodiment of the invention, i.e. the first and second three-phase systems are offset angularly by 30°.

The first and second power terminals 12, 13 are thus connected to the connection lugs of the first and second phase windings 2, 3, 4, 5, 6, 7, such as to provide the interconnection diagram shown in FIG. 3*b*.

Thus, the instantaneous electric power of the pairs W1-V2, V1-U2 and U1-W2 of the first and second phase currents is constant, and the losses are distributed regularly between the three electronic power modules 15, 16, 17.

The size of the thermal dissipaters 24 of the electronic power modules 15, 16, 17 can thus be smaller than in a non-optimised architecture, as in the first configuration shown in FIG. 3*a*.

Persons skilled in the art will also have recognised on the rear bearing 22 of the rotary electrical machine according to the invention presented in FIG. 4 other external connection elements of the electronic power modules 15, 16, 17, such as power tracks 25 connected to a positive pole B+ of the machine 22, and signal connectors 26.

They will have noted the presence of filtering capacitors 27, as well as other components which will not be described in detail, since they do not contribute directly to the creation of the objective of the invention.

It will be appreciated that the invention is not limited simply to the preferred embodiment described above.

A similar description could be provided for rotary electrical machines of the double-three-phase type with angles of offsetting φ different from 30°, in particular 15°, 45° or 60°.

The same analysis would lead to an architecture of interconnected electronic power modules 15, 16, 17 wherein the thermal losses would be balanced, if not totally, but as much as possible, by selecting associations in pairs of the phases which make it possible to limit the variation of the total instantaneous electric power in each of the electronic power modules 15, 16, 17 around its mean value.

For example, in the case of an angle of offsetting φ of 45°, the variation of the total instantaneous electric power around its mean value is limited to +/−26% if there is selection of an association of the pairs U2-V1, V2-W1 and W2-U1 of the first and second phase currents for which the phase offsetting α is 75°.

The invention thus incorporates all the possible variant embodiments, provided that these variants remain within the scope defined by the following claims.

The invention claimed is:

1. A structure of interconnected electronic power modules (15, 16, 17) in a hexaphase rotary electrical machine (22), comprising three first (2, 3, 4) and three second (5, 6, 7) phase windings forming a first three-phase system and a second three-phase system offset angularly by a predetermined winding offsetting angle (φ), each of said first (2, 3, 4) and second (5, 6, 7) phase windings has a distal end connected to one of said electronic power modules (15, 16, 17), and a proximal common end connected to the proximal common ends of other of said first (2, 3, 4) and second (5, 6, 7) phase windings, said first (2, 3, 4) and second (5, 6, 7) phase windings having respectively first (U1, V1, W1) and second (U2, V2, W2) phase currents passing through them, said electronic power modules (15, 16, 17) configured to control the first (U1, V1, W1) and said second (U2, V2, W2) phase currents, each of said electronic power modules (15, 16, 17) comprising:

electronic components arranged in a casing, and external connection elements (12, 13, 25, 26) comprising first and second power terminals (12, 13) each configured to be connected electrically to first and second examples of said first and second phase windings (2, 3, 4; 5, 6, 7), said first and second power terminals (12, 13) of said electronic power modules (15, 16, 17) interconnected electrically to said first and second examples of said first and second phase windings (2, 3, 4; 5, 6, 7) such that an assembly of each phase offsetting angle (α) between said first and second examples of said first and second phase windings minimizes variation of a total instantaneous electric power according to an electrical angle in each of said electronic power modules (15, 16, 17), said first and second power terminals (12, 13) of at least one of said electronic power modules (15, 16, 17) interconnected electrically to said first example of said first phase windings (2, 3, 4) and said second example of said second phase windings (5, 6, 7).

2. The structure according to claim 1, wherein said total instantaneous electric power in each of said electronic power modules (15, 16, 17) is substantially constant according to said electrical angle.

3. The structure according to claim 2, wherein said winding offsetting angle (φ) is 30°, and said phase offsetting angle (α) is 90°.

4. A hexaphase rotary electrical machine (22) of the double-three-phase type, comprising a structure of interconnected electronic power modules (15, 16, 17) according to claim 3.

5. A hexaphase rotary electrical machine (22) of the double-three-phase type, comprising a structure of interconnected electronic power modules (15, 16, 17) according to claim 2.

6. A hexaphase rotary electrical machine (22) of the double-three-phase type, comprising a structure of interconnected electronic power modules (15, 16, 17) according to claim 1.

* * * * *